(12) United States Patent
Krastev et al.

(10) Patent No.: US 9,849,546 B2
(45) Date of Patent: Dec. 26, 2017

(54) METHOD FOR MANUFACTURING A HYDRAULIC DEVICE

(75) Inventors: Ianislav Krastev, Ludwigsburg (DE); Helmut Schneider, Aichtal (DE); Steffen Strauss, Rutesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 983 days.

(21) Appl. No.: 13/879,164

(22) PCT Filed: Sep. 8, 2011

(86) PCT No.: PCT/EP2011/065547
§ 371 (c)(1),
(2), (4) Date: Jun. 24, 2013

(87) PCT Pub. No.: WO2012/048963
PCT Pub. Date: Apr. 19, 2012

(65) Prior Publication Data
US 2013/0284295 A1    Oct. 31, 2013

(30) Foreign Application Priority Data
Oct. 13, 2010   (DE) .................. 10 2010 042 400

(51) Int. Cl.
*B23P 15/00*   (2006.01)
*F15B 13/08*   (2006.01)
(Continued)

(52) U.S. Cl.
CPC ............ *B23P 15/001* (2013.01); *F15B 13/00* (2013.01); *F15B 13/081* (2013.01);
(Continued)

(58) Field of Classification Search
CPC .. F15B 13/081; F15B 13/00; Y10T 29/49405; Y10T 29/49412;
(Continued)

(56) References Cited

U.S. PATENT DOCUMENTS 2,882,588 A * 4/1959 Rieppel .................. B23K 20/02
                                             228/173.2
3,018,543 A * 1/1962 Beck ..................... B21D 53/045
                                             228/173.6
(Continued)

FOREIGN PATENT DOCUMENTS

CN    101050824    10/2007
CN    101324278    12/2008
(Continued)

OTHER PUBLICATIONS

DE 1020/08062829 A1, Machine Translation, Date: Dec. 2008, Inventor: Blersch et al.*
(Continued)

*Primary Examiner* — Jacob Cigna
(74) *Attorney, Agent, or Firm* — Norton Rose Fulbright US LLP

(57) ABSTRACT

A method for manufacturing a hydraulic device is described, in which at least one hydraulic channel and at least one connection are manufactured and/or hydraulically connected to one another, the hydraulic device being manufactured from at least two plates, and the plates being formed and connected to one another with the aid of the processes of cold forming, deep drawing, punching, punch riveting, and/or clinching.

11 Claims, 9 Drawing Sheets

(51) Int. Cl.
*F16K 27/02* (2006.01)
*F15B 13/00* (2006.01)

(52) U.S. Cl.
CPC ....... *F16K 27/029* (2013.01); *Y10T 29/49956* (2015.01); *Y10T 137/87885* (2015.04)

(58) Field of Classification Search
CPC ......... Y10T 29/49416; Y10T 29/49925; Y10T 29/49927; Y10T 29/49956; Y10T 137/87885; B23P 15/001; F16K 27/029
USPC ...................................................... 29/890.13
See application file for complete search history.

(56) References Cited

U.S. PATENT DOCUMENTS

| | | | | |
|---|---|---|---|---|
| 3,631,881 A * | 1/1972 | Bowditch | ................ | F15C 5/00 137/271 |
| 4,436,147 A * | 3/1984 | Hudson, Jr. | ............. | F01N 3/043 165/164 |
| 4,510,660 A * | 4/1985 | Hoeffken | ................ | F24H 3/105 165/170 |
| 4,929,038 A * | 5/1990 | Reinartz | ................ | B60T 8/3675 137/596.17 |
| 7,942,168 B2 * | 5/2011 | Kuehnel | ................ | F15B 13/081 138/103 |
| 2001/0006019 A1 * | 7/2001 | Deininger | ................ | B66F 9/22 91/508 |
| 2010/0186830 A1 * | 7/2010 | Shigyo | ................ | F16H 61/0009 137/334 |

FOREIGN PATENT DOCUMENTS

| | | | | |
|---|---|---|---|---|
| DE | 10 2008 012 691 | | 9/2008 | |
| DE | 10 2008 012 692 | | 9/2008 | |
| DE | 10 2008 062 829 A1 * | | 7/2010 | ............... F16J 15/12 |
| JP | 5659075 | | 5/1981 | |

OTHER PUBLICATIONS

International Search Report, International Application No. PCT/EP2011/065547, dated Dec. 7, 2011.

* cited by examiner

METHOD FOR MANUFACTURING A HYDRAULIC DEVICE

FIELD

The present invention relates to a method, a valve module, and a hydraulic module.

BACKGROUND INFORMATION

Hydraulic controllers, which include a plurality of elements, such as valves or hydraulic channels, are used for controlling transmissions, in particular automatic transmissions in motor vehicles. Hydraulic controllers which include, for example, assemblies such as a valve plate having hydraulic channels, an intermediate plate, and a valve housing having a number of valves, are conventional. The valve plate, the intermediate plate, and the valve housing each have a generally flat basic shape, so that they may be assembled layered one on top of another and may then be stably screwed together with one another, for example. The intermediate plate may have boreholes, through which a hydraulic connection between the valve plate and the valve housing is made possible in a particular specific way.

For modern automatic transmissions—for example, those having a start-stop function—so-called hydraulic accumulators are frequently used, which are situated at the transmission if necessary. A hydraulic valve which is electrically operable by a transmission control unit ("volume flow rate control unit") controls the access to the hydraulic accumulator, so that a controlled exchange of fluid between the store and the hydraulic circuit of the transmission is made possible.

The hydraulic valve is manufactured, for example, from a plastic injection molding. Inter alia, it may include an electromagnet having an armature, a valve ball, a valve spring, a check valve having a bypass, and a number of further elements.

The hydraulic valve is frequently implemented as a discrete element, which is connected via hydraulic channels to the hydraulic accumulator, on the one hand, and to the remaining hydraulic system, on the other hand. For this purpose, the hydraulic valve must have a corresponding leak tightness for the pressurized fluid.

SUMMARY

Features in accordance with the present invention are described below and are shown in the figures. The features may be important for the present invention both alone and in various combinations, without explicit reference once again being made thereto.

An example method according to the present invention may have the advantage that a hydraulic device, for example, a hydraulic module or a valve module, may be manufactured relatively inexpensively, rapidly, and simply, the material usage being able to be decreased and elements of a hydraulic system also being able to be integrated in a simple way. In addition, tolerance requirements may be minimized, the effort during the final assembly of the hydraulic device may be decreased, and the extent of machining postprocessing may be reduced. Furthermore, the example method allows a shell construction of the hydraulic device, undercuts in boreholes, for example, radial peripheral grooves for the oil supply of valves, also being able to be implemented simply.

With the aid of the example method according to the present invention, a hydraulic device may be manufactured with the aid of generally non-cutting shaping. At least two plates are first formed with the aid of the processes of cold forming, deep drawing, punching, punch riveting, and/or clinching in one or multiple steps and then connected to one another in at least one further step. This is achieved particularly well if the plates are each formed into a type of shell, so that cavities are created at least regionally, which form hydraulic channels or may be used to accommodate various elements, for example. Other areas of the plates may remain formless, so that together with corresponding shaping hydraulically sealed sections may be produced on the particular opposing plate. The term "clinching" describes a method according to the present invention to connect plates to one another, "joining" being carried out with the aid of shaping. The terms "pressure joining," "clinching" or "TOX clinching" are also used in a meaning at least similar to "clinching." Furthermore, it is also possible to connect the plates at least regionally with the aid of spot welding or laser welding.

The hydraulic device according to the present invention is initially created as such through the connection of the at least two plates, which, after the connection, form a sandwich-type unit together with a possible intermediate plate. In addition, it is also possible to provide multiple intermediate plates, so that if necessary very diverse and even three-dimensional structures may be produced comparatively simply. Cavities provided in the hydraulic device are preferably created generally as symmetrical halves, i.e., as half-cylinders cut in the longitudinal axis, for example. With the aid of the described processes, the manufacturing of the hydraulic device according to the present invention may in general be carried out in a very diverse and differentiated way.

Commercially available semifinished sheet-metal products may be used as the starting material for the method according to the present invention, for example, "aluminum coil" and the like. Additional costs may be saved in this case.

A first application of the present invention provides that the hydraulic device is a hydraulic module of a transmission. A possibly very extensive hydraulic unit may thus be manufactured cost-effectively, as may be used, for example, in an automatic transmission of a motor vehicle. For example, numerous hydraulic channels may be formed or hydraulic connections may be formed or incorporated in the hydraulic module.

A second application of the present invention provides that the hydraulic device is a valve module, in particular for filling and emptying a hydraulic accumulator. The method according to the present invention may therefore also advantageously be applied for manufacturing comparatively small units or elements. Other manufacturing methods, for example, injection molding or milling, may thus be replaced, and costs may therefore be saved.

The example method is particularly high performance if at least two of the described processes are carried out in the same work step, i.e., generally simultaneously, in particular punching, punch riveting, and a shaping procedure. The number of required processing steps may thus be substantially decreased. The simultaneous application of the processes according to the present invention is possible both during the separate manufacture of the plates formed like half shells, and during their connection, i.e., the final assembly. For example, the half shells may be permanently connected and hydraulically sealed by punch riveting, while simultaneously an outline of the hydraulic module is precisely punched, and optionally further cold forming may be carried out.

In addition, the example method provides that the plates are connected to one another by using at least one intermediate plate. For example, the intermediate plate may be implemented as essentially rigid. With the aid of punch-outs or boreholes, hydraulic channels may be formed in the intermediate plate, which allow an exchange of fluid between the cavities of the two plates formed into half shells. In addition, it may be the object of the intermediate plate to achieve sufficient hydraulic leak tightness of the plates to be connected.

One example embodiment of the method provides that the intermediate plate is formed by cold forming, deep drawing, punching, punch riveting, and/or clinching. The intermediate plate is implemented as a sheet-metal part, using which—beyond the possibilities of a rigid intermediate plate—the described three-dimensional structures may additionally also be manufactured.

The present invention may be particularly useful if at least one component and/or at least one hydraulic assembly is integrated into the hydraulic device before the shaping. In particular, the method may include at least one of the following steps:
shaping a first plate into a half shell;
shaping a second plate into a half shell;
inserting at least one component and/or at least one hydraulic assembly into at least one of the half shells;
inserting the at least one intermediate plate;
connecting the two half shells and simultaneously manufacturing at least regionally hydraulically sealed sections with the aid of punch riveting, clinching, soldering, welding, and/or gluing.

The various plates may be formed and/or punched step-by-step. Components and/or hydraulic assemblies may then be inserted or pressed into previously created "semicircular" cavities. In a further step, the plates are permanently connected together with the inserted and/or pressed-in elements. In particular the valve module to be manufactured according to the present invention may be produced as an integral part of the hydraulic module thanks to the same manufacturing method. It is, as the case may be, possible to decrease the requirements for the leak tightness of the valve module. Furthermore, it is even possible to integrate the valve module or the hydraulic module into the transmission of the motor vehicle, whereby, as the case may be, no hydraulic interfaces of the hydraulic device are externally active.

Therefore, example steps are described, which are applicable according to the present invention for manufacturing the hydraulic device, i.e., for example, the hydraulic module or the valve module. It is understood that the list is only an example, and the steps may be repeated almost arbitrarily, changed in their sequence, supplemented, and/or combined or at least partially carried out simultaneously. The leak tightness of the finished hydraulic device may, if necessary, be further improved if in addition to the mechanical methods, the sealing sections both in the interior of the hydraulic device, and at its edge sections, are established with the aid of a flat sealant, for example, a film, or with the aid of gluing. It may therefore be possible to permanently connect the plates of the hydraulic device without screws or rivets.

In addition, the inserted component and/or the inserted hydraulic assembly may be oversized in relation to a formation of the half shells, into which the component or the hydraulic assembly is inserted. With predefined dimensions of the component or the hydraulic assembly, the formations are dimensioned with a corresponding undersize. Leaks of the fluid may thus be decreased or even prevented.

One example embodiment of the method provides that the plates are semifinished products implemented as a "coil." "Coil" is understood as a coiled metal strip as a raw product, which is preferably made of a steel alloy or an aluminum alloy. Therefore, commercially available and particularly cost-effective raw material forms may advantageously be used to manufacture the hydraulic device. In particular, mass production of the hydraulic device may also be simplified and cheapened.

Furthermore, an example hydraulic module for the hydraulic controller of a transmission is provided, the hydraulic module being manufactured with the aid of the example method according to the present invention. For example, the transmission is an automatic transmission, a stepped automatic transmission, or a dual-clutch transmission. The hydraulic module may thus be manufactured comparatively simply, cost-effectively, and optionally using a smaller quantity of material.

An example valve module for filling and emptying a hydraulic accumulator is also provided, the valve module being manufactured with the aid of the example method according to the present invention. For example, the hydraulic accumulator supplements the hydraulic circuit of an automatic transmission, which is designed for a so-called "start-stop" function of a motor vehicle. In a first embodiment, the valve module is manufactured according to the present invention as a separate element. In a second embodiment, the valve module is manufactured as an integral part together with a hydraulic module, from which the additional advantage may result that the valve module may have small leaks, if necessary.

BRIEF DESCRIPTION OF THE DRAWINGS

Specific exemplary embodiments of the present invention are explained below with reference to the figures.

Identical reference numerals are used in all figures for functionally-equivalent elements and dimensions, even in different specific embodiments.

DETAILED DESCRIPTION OF EXAMPLE EMBODIMENTS

Figure 1:
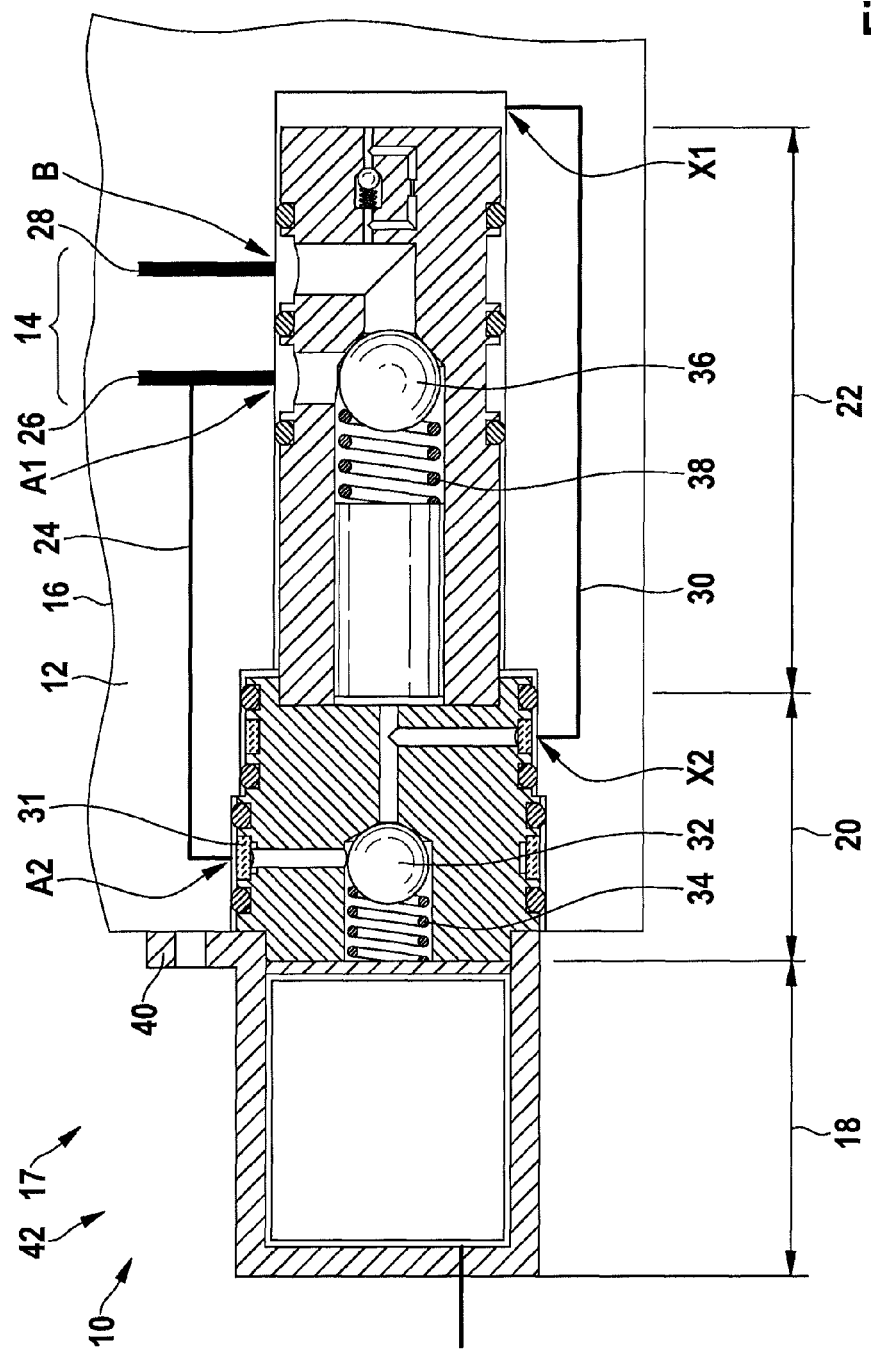
FIG. 1 shows an outline of a valve module in a hydraulic system of a transmission.

FIG. 1 shows a valve module 10 together with a hydraulic module 12, incorporated in a hydraulic system 14 of an automatic transmission (not shown) of a motor vehicle.

Hydraulic module 12 is schematically shown by an outline 16 in FIG. 1. Valve module 10 or hydraulic module 12 or the entirety of valve module 10 and hydraulic module 12, respectively, each form a hydraulic device 17. Valve module 10 is divided into three sections in the present case. It includes a magnetic circuit 18, a pilot control stage 20, and a main stage 22, as indicated in FIG. 1 from left to right with the aid of arrows.

A hydraulic line 24 connects a connection A2 of pilot control stage 20 to a connection A1 of main stage 22, and a hydraulic line 26 also connects connection A1 to hydraulic system 14 (not explained in greater detail in FIG. 1). A hydraulic line 28 also connects a connection B of main stage 22 to hydraulic system 14. A further hydraulic line 30 connects a connection X1 of main stage 22 to a connection X2 of pilot control stage 20. Furthermore, a hydraulic filter 31 is situated at connection A2 of pilot control stage 20.

Pilot control stage 20 includes a valve ball 32 and a spring 34, and main stage 22 also includes a valve ball 36 and a spring 38. Their functions will not be explained in greater detail here. Magnetic circuit 18 is screwed onto hydraulic module 12 by a flange 40. As a whole, magnetic circuit 18, pilot control stage 20, and main stage 22 also form a hydraulic assembly 42 of hydraulic module 12.

FIG. 2 schematically shows three variants 2a, 2b, and 2c of a possible integration of valve module 10 or hydraulic assembly 42 into hydraulic module 12. The representation of FIG. 2 generally relates to the representation of FIG. 1, the details shown in FIG. 1 not being shown for the sake of clarity.

Figure 2A:
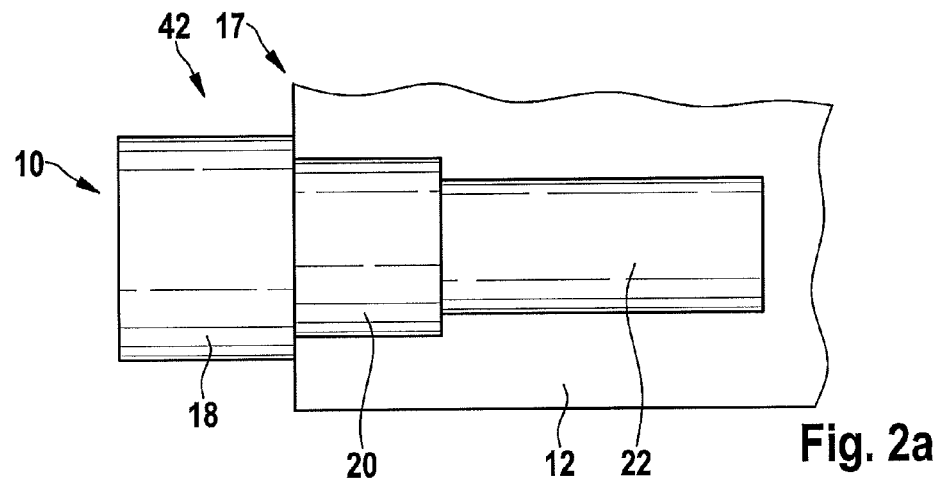
FIG. 2 shows three different integration steps of the valve module of FIG. 1.
Figure 2B:
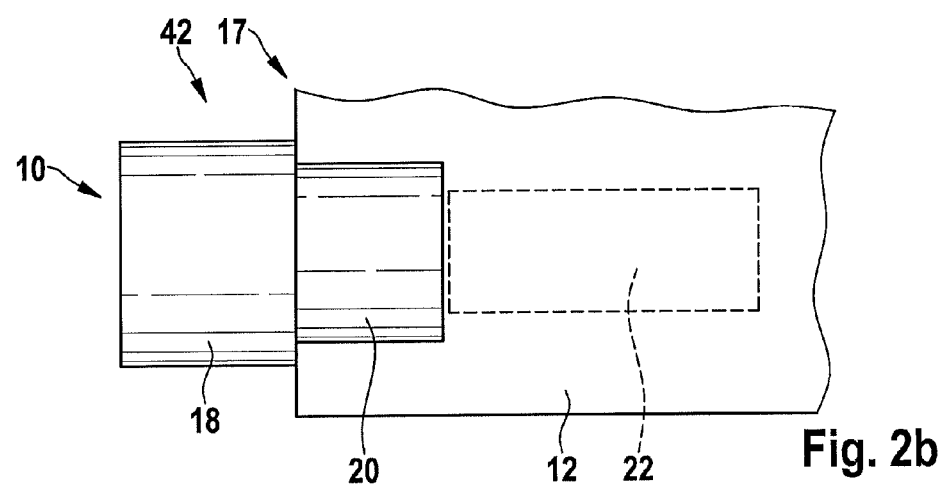
Figure 2C:
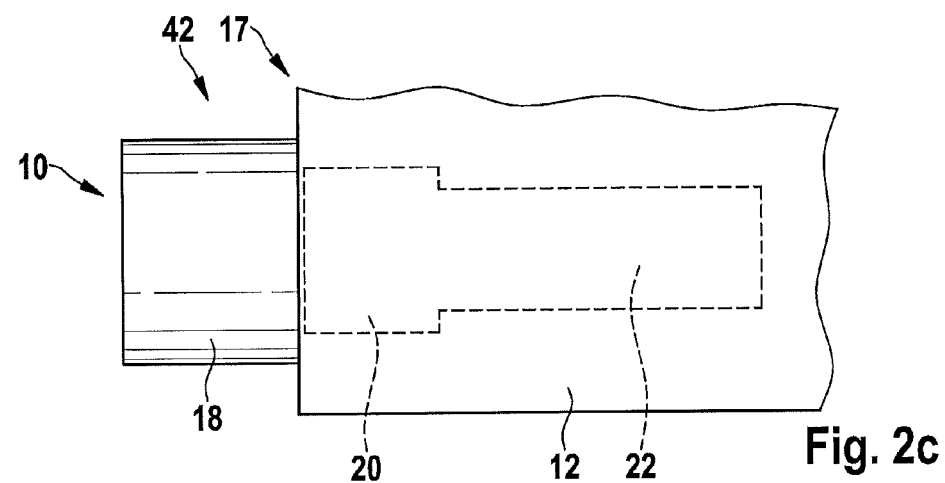

In FIG. 2a, valve module 10 is implemented as a structural unit, which is installed together with hydraulic module 12 in a shared housing, i.e., is combined. In FIG. 2b, main stage 22 is already an integral part of hydraulic module 12. In FIG. 2c, pilot control stage 20 is also integrated into hydraulic module 12 in addition to main stage 22, so that only magnetic circuit 18 is implemented as a separate element.

The example method for manufacturing hydraulic device 17 may be flexibly applied. Due to the fact that valve module 10, on the one hand, and hydraulic module 12, on the other hand, may each be manufactured at least partially with the aid of comparable method steps, valve module 10 may also partially or even entirely be implemented as an integral part of hydraulic module 12, as is explained in detail below.

Figure 3A:
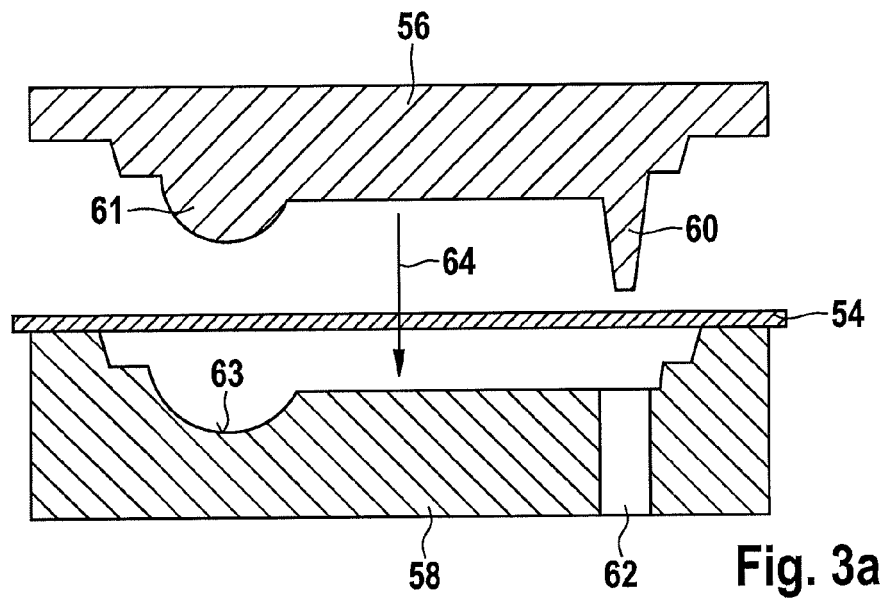
FIG. 3 shows a sequence of method steps for the manufacture of a first half shell of a hydraulic device.
Figure 3B:
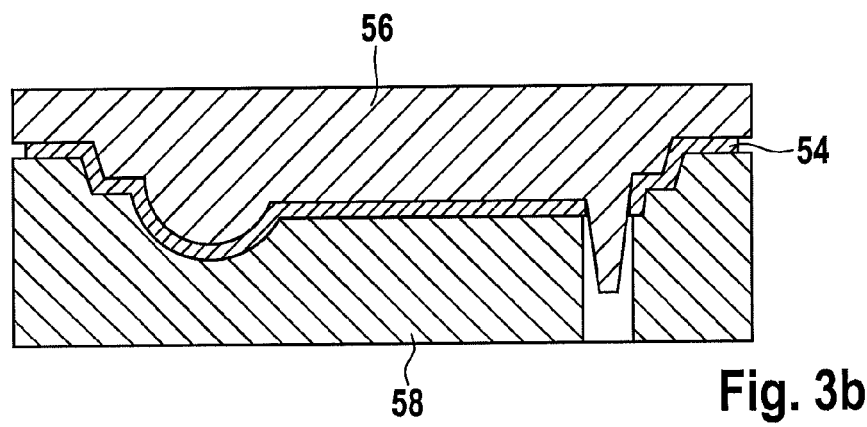
Figure 3C:
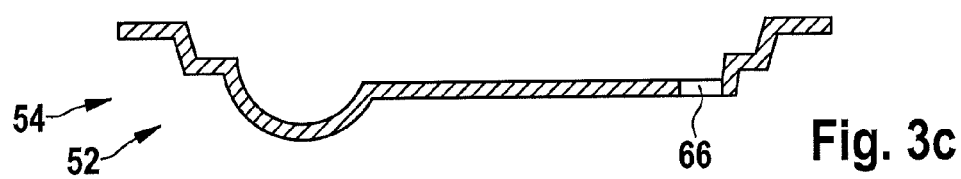

FIG. 3 schematically shows, in steps 3a, 3b, and 3c, a first sequence of method steps for manufacturing a first half shell 52 of hydraulic device 17. The representation of FIG. 3 is generalized and schematic and shows only hydraulic device 17 as an example as a small detail in a sectional view.

In a step 3a, a flat plate 54 is inserted into a press (not shown) between a top tool 56 in the figure and a bottom tool 58 in the figure. Top tool 56 has, inter alia, a (punching) stamp 60 and a convex formation 61, and accordingly bottom tool 58 has, inter alia, a recess 62 and a concave formation 63. An arrow 64 identifies a movement of top tool 56 in the direction toward plate 54 or bottom tool 58. Both tools 56 and 58 are designed as matching or complementary to one another with respect to their function.

In a step 3b, after the movement is completed, a final position of top tool 56 and bottom tool 58 is shown. Inserted plate 54 is accordingly deformed and now has a three-dimensional geometry.

A step 3c shows first half shell 52, which was manufactured with the aid of steps 3a and 3b, as it may be removed from the press after the end of the movement. The contour of first half shell 52 generally corresponds to the contours of tools 56 and 58. First half shell 52 now has, inter alia, an opening 66.

Plate 54 was inserted in the present case as an "aluminum coil" semifinished sheet-metal product into the press. It is apparent how a desired design of first half shell 52 may be created by cold forming of plate 54 and a simultaneously occurring punching procedure with the aid of a few process steps.

A number of further manufacturing steps may also be carried out together with the method steps shown in steps 3a through 3c. For example, an edge of plate 54 may advantageously also be punched. The precision may be sufficiently high so that later postprocessing is minor or may even be omitted. However, this is not shown in FIG. 3.

Figure 4A:
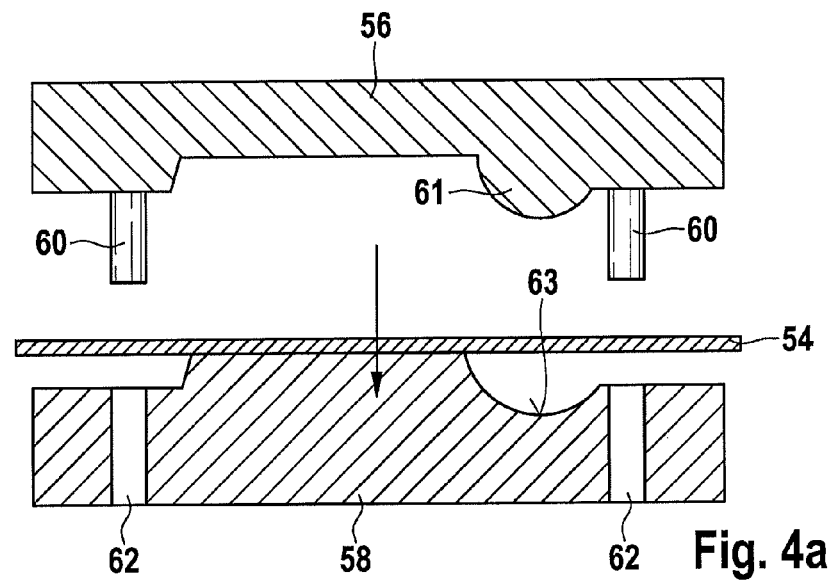
FIG. 4 shows a sequence of method steps for the manufacture of a second half shell of the hydraulic device.
Figure 4B:
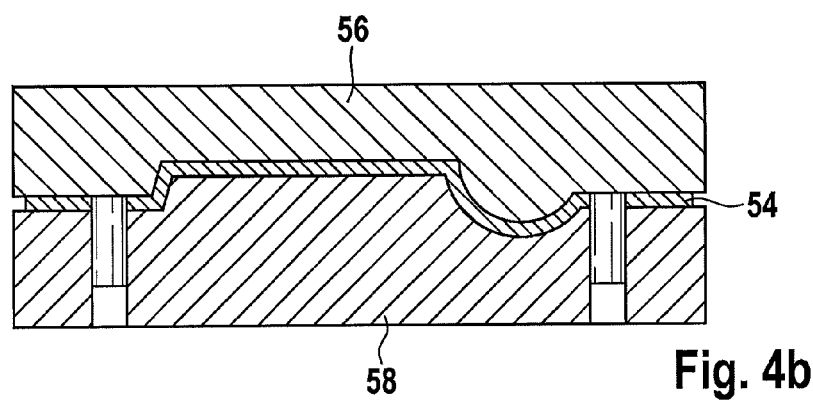
Figure 4C:
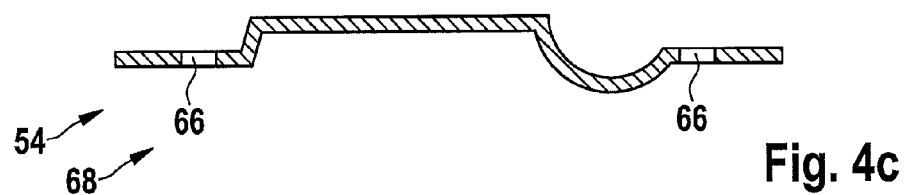

FIG. 4 schematically shows, comparably to FIG. 3, the manufacturing of a second half shell 68 of hydraulic device 17 in steps 4a, 4b, and 4c. Second half shell 68 has a different shape in comparison to first half shell 52. The method steps are similar or even identical to FIG. 3, so that they will not be explained in greater detail here.

Figure 5A:
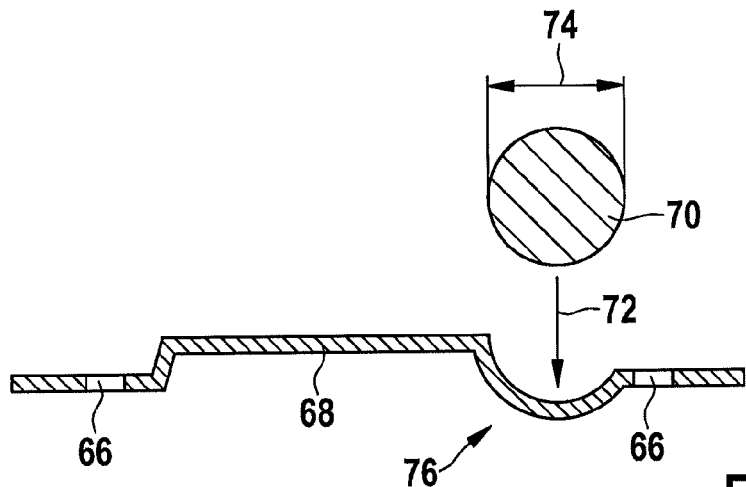
FIG. 5 shows an assembly of the first half shell and the second half shell according to FIGS. 3 and 4.
Figure 5B:
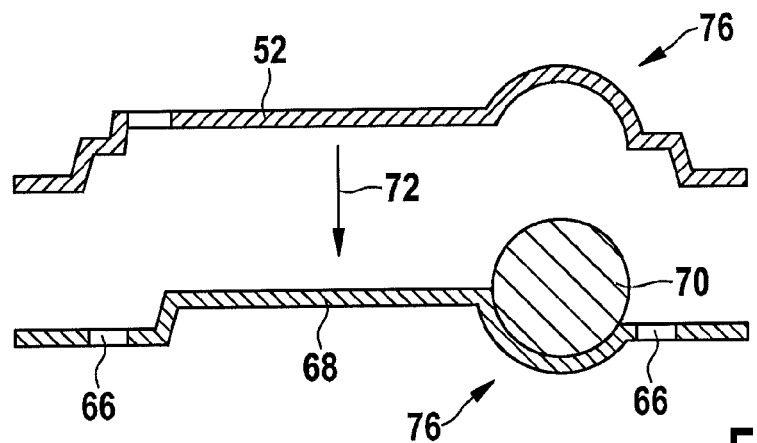
Figure 5C:
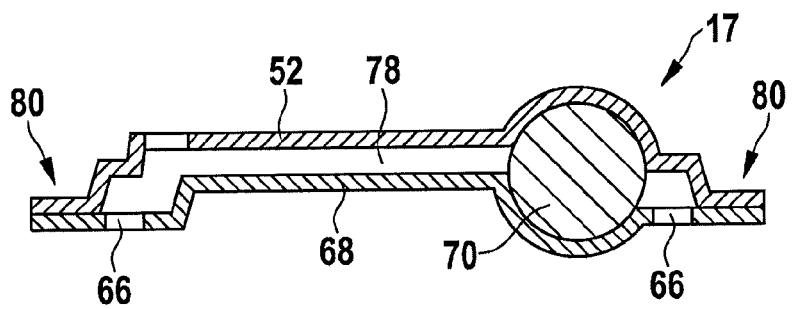

FIG. 5 shows an assembly of first half shell 52 and second half shell 68 for creating hydraulic device 17 in a schematic and simplified representation. In a step 5a, second half shell 68, which is manufactured according to FIG. 4, is positioned in a press, and a preassembled component 70 is inserted into second half shell 68. An arrow 72 shows the assembly direction.

In a step 5b, first half shell 52 manufactured according to FIG. 3 is positioned over second half shell 68 and preassembled component 70 and assembled in the direction of arrow 72. A step 5c shows the assembly state of hydraulic device 17 achieved by steps 5a and 5b. Two sections 80 shown in FIG. 5c may be used for further manufacturing steps if needed, as will be shown in following FIG. 6.

In the outline shown in FIG. 5, preassembled component 70 has a round cross section and may be, for example, a slide mounted in a sleeve, a cartridge valve, a shuttle valve, a hydraulic aperture, or a valve module 10. A diameter 74 of preassembled component 70 is oversized in relation to a formation 76 of first half shell 52 and second half shell 68. Possible leaks of preassembled component 70 to surroundings 78 and/or a fluid flowing tangentially past component 70 may thus be minimized within hydraulic device 17.

The assembly of hydraulic device 17 may be carried out comparatively simply and rapidly with the aid of steps 5a through 5c. The assembly areas in half shells 52 and 68 may be designed to be well accessible for this purpose. Overall, finished hydraulic device 17 has a relatively compact construction and may possibly also save weight in comparison to an aluminum casting. Furthermore, machining postprocessing on hydraulic device 17 may generally be omitted.

Figure 6A:
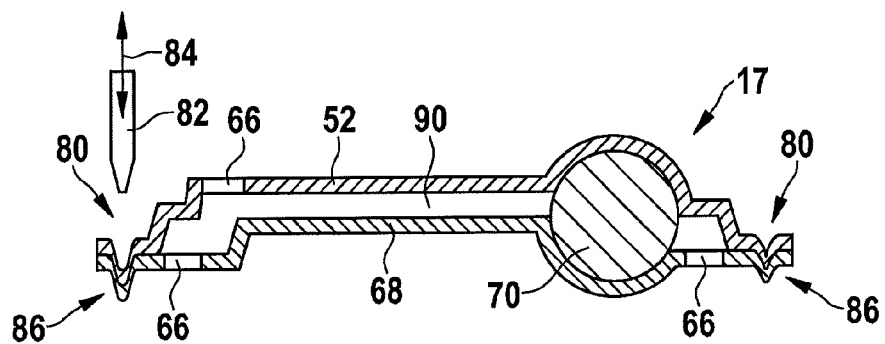
FIG. 6 shows the permanent connection of the first and second half shells assembled according to FIG. 5.

FIG. 6 shows a further step for the manufacturing of hydraulic device 17. In FIG. 6a, a ram 82 is moved in the direction of a double arrow 84, so that a deformation 86 of first and second half shells 52 and 68 forms in the area of section 80.

Figure 6B:
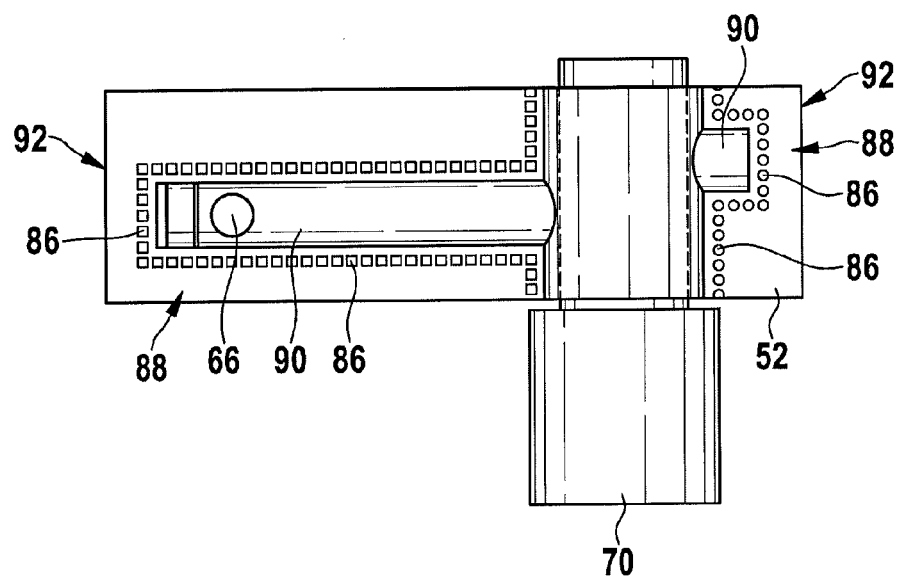

FIG. 6b shows a top view onto the representation of FIG. 6a, the scales of the representations in FIGS. 6a and 6b in part slightly deviating from one another. A plurality of deformations 86, which are situated closely spaced apart in the present case, have been formed along sealing sections 88 with the aid of multiple successive manufacturing steps of FIG. 6a.

The representation of ram 82 and deformations 86 resulting therefrom of first and second half shells 52 and 68 is generalized and is representative for multiple possible methods. For example, the method of FIG. 6a may be carried out as punch riveting or as clinching. In technical parlance, the terms "pressure joining," "TOX clinching," or "clinching" are sometimes also used for "clinching."

First half shell 52 may be permanently connected to second half shell 68 with the aid of the illustrated simple manufacturing steps, a plurality of possible components 70 and/or hydraulic assemblies 42 also being able to be integrated. With the aid of deformations 86, the connection is permanently established and—as in the present case—sealing sections 88 may be formed. In addition, without additional costs, hydraulic channels 90 or other cavities may also be created, which connect preassembled component 70 to other areas (not shown in FIG. 6) via openings 66 in FIG. 6. Edge sections 92 of hydraulic device 17 are flush and require no or only slight machining postprocessing.

Hydraulic device 17 shown in FIG. 6 may additionally also have undercuts for boreholes. However, this is not shown in FIG. 6. Boreholes as the guide for control pistons assume hydraulic functions in conjunction with one or multiple control edges. A minimal radius in the area of the joined half shells in the longitudinal direction is not to be avoided in terms of the method. However, this is not permissible in the case of the high demands on geometry and dimensional accuracy of the borehole. Using minor machining postprocessing on the borehole diameter and the control edge, these requirements may be achieved. Such undercuts may form radial peripheral grooves for the oil supply of valves, for example, and may be provided with a control edge by machining after the connection of half shells 52 and 68. The occurring chip volume may be comparatively small. Therefore, the manufacture of hydraulic device 17 may additionally be cheapened.

Figure 7:
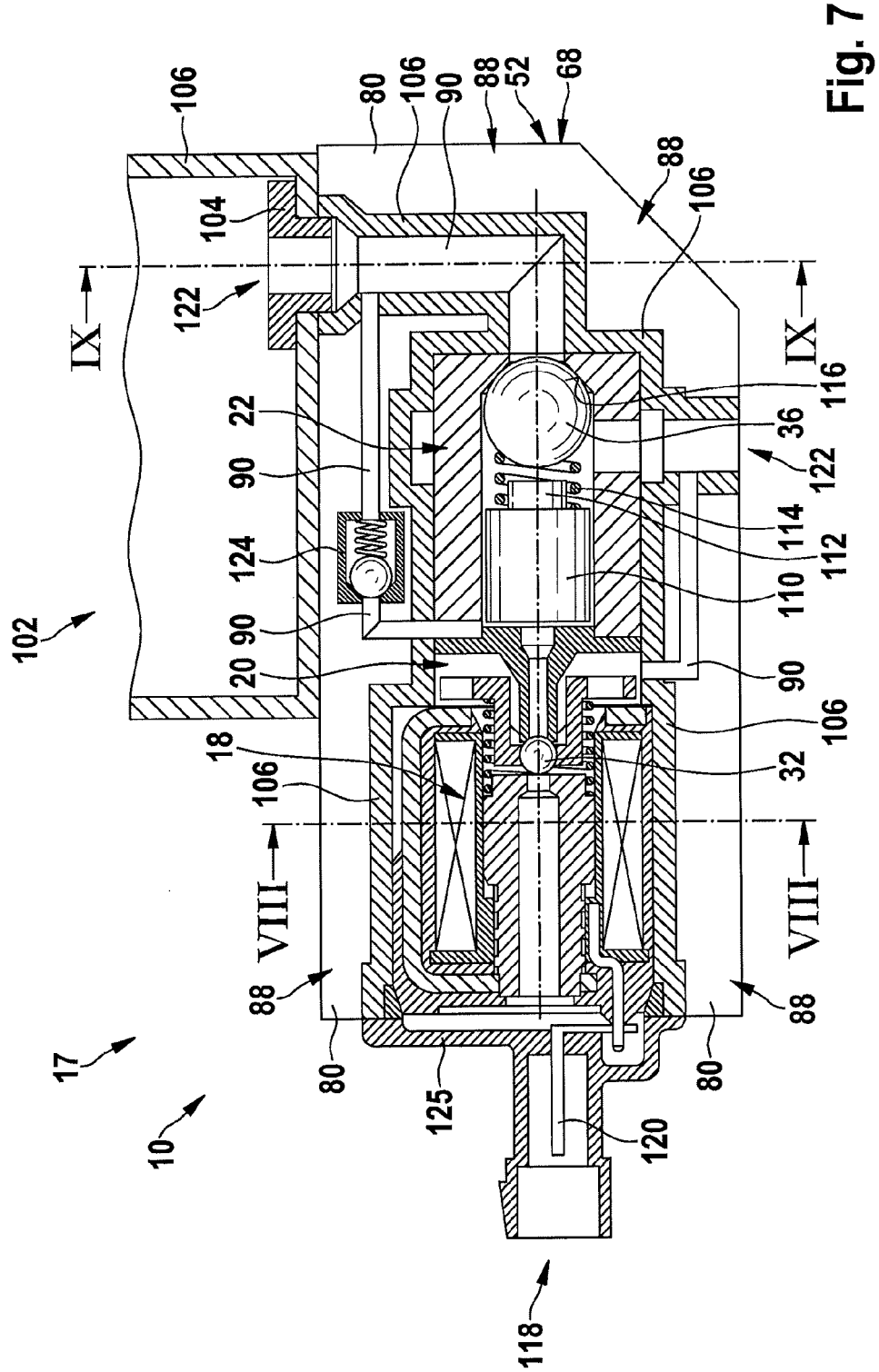
FIG. 7 shows a sectional view of the valve module.

FIG. 7 shows a hydraulic valve module 10 ("volume flow rate control unit"), which is electrically operable by a transmission control unit of a motor vehicle, and which controls the access to a hydraulic accumulator 102. FIG. 7 thus represents a hydraulic device 17, as is formed from hydraulic accumulator 102 and valve module 10 situated thereon. Hydraulic accumulator 102 and valve module 10 are permanently mechanically and hydraulically connected to one another, for example, compressed, with the aid of a connecting element 104.

Valve module 10 includes a number of housing sections 106, in which a number of elements are situated. Valve module 10 includes—similarly to valve module 10 of FIG. 1—a magnetic circuit 18, a pilot control stage 20 having a valve ball 32, and a main stage 22, inter alia. Main stage 22 includes, inter alia, a guide part 110, a stop part 112, a valve spring 114, a valve ball 36, and a valve seat 116.

Furthermore, hydraulic device 17 includes an electrical connection 118 having a plug 120, a hydraulic interface 122 to hydraulic accumulator 102 (in the top area of the drawing), and a hydraulic interface 122 to a transmission (not shown) (in the bottom area of the drawing). Hydraulic interface 122 in the bottom area of the drawing may be implemented, for example, with the aid of a threaded connection or a pressed-in pipe. However, this is not shown in FIG. 7. In addition, hydraulic device 17 includes a check valve 124 having a throttle in a bypass branch of main stage 22, check valve 124 including a disk, a spring, and a valve ball (without reference numerals).

In particular, hydraulic device 17 includes a first half shell 52 and a second half shell 68, which are indicated in a right area of FIG. 7 by the reference numerals. Various sections of hydraulic device 17, in particular in an area of main stage 22, are hydraulically connected with the aid of hydraulic channels 90. In the present case, hydraulic device 17 is implemented without the use of an intermediate plate, as will be explained in greater detail in FIG. 10.

Valve module 10 is implemented as a servo valve and allows a controlled exchange of fluid between hydraulic accumulator 102 and a hydraulic circuit of the transmission. Therefore, inter alia, a so-called "start-stop function" of an automatic transmission of the motor vehicle may be assisted.

The assembly of valve module 10 may be simplified if, before the compression procedure, the elements situated in valve module 10 are inserted into half shells 52 and 68 at least partially preassembled. In particular, magnetic circuit 18, which is extrusion-coated using plastic, is preassembled together with a ball armature including valve ball 32 in a simple valve housing.

Connecting parts or connections of valve module 10 may be pressed into the two half shells 52 and 68 during the assembly thereof. It is also possible to press such connecting parts or connections in a subsequent method step into the joined and permanently connected half shells 52 and 68.

Furthermore, valve module 10 has a cover 125—shown in the left area of the figure—which is pressed onto first and second half shells 52 and 68 after the assembly thereof. An electrical contact is established between plug 120 and magnetic circuit 18 at the same time with the aid of a so-called "ram contact." It is also possible to establish magnetic circuit 18 or other possible electrical connections of valve module 10 or hydraulic device 17 with the aid of an insulation displacement connection.

By employing the method steps shown in FIGS. 3 through 6, hydraulic device 17 may be manufactured having a plurality of different functions and shapes. In particular, sections 80 are also formed, which are at least regionally formed as sealing sections 88 using deformations 86—not shown in FIG. 7. With the aid of deformations 86, first half shell 52 and second half shell 68 are also permanently connected to one another. Deformations 86 are formed with the aid of clinching. In addition, hydraulic device 17 is at least regionally manufactured using cold forming, deep drawing, punching, and punch riveting. However, this is not shown in detail in FIG. 7.

Figure 8:
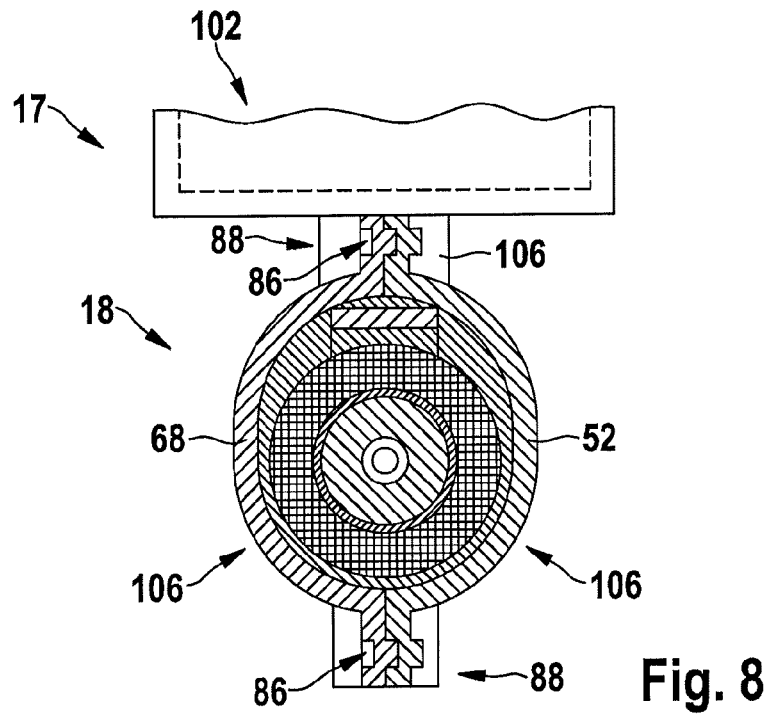
FIG. 8 shows a sectional view along a line VIII-VIII of FIG. 7.
Figure 9:
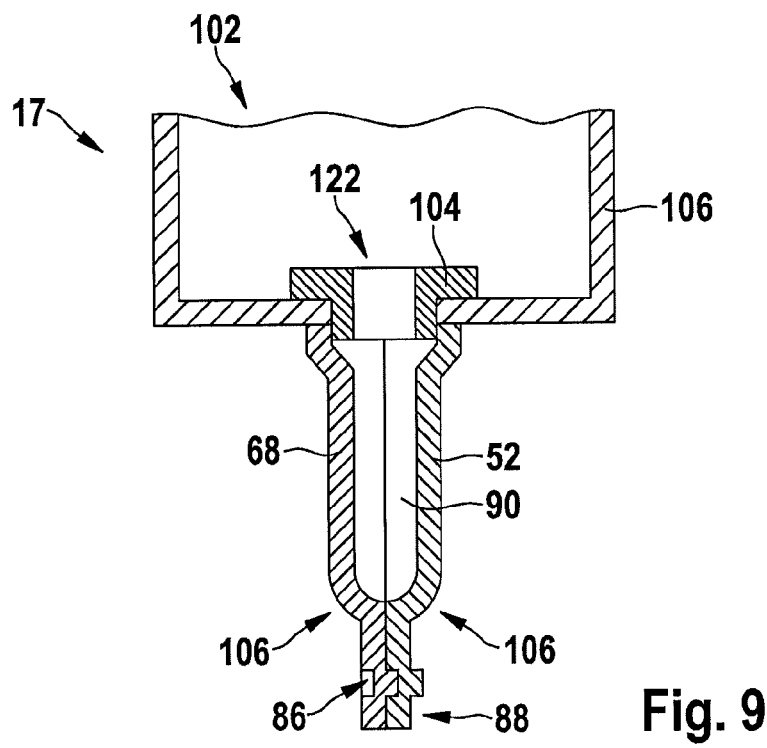
FIG. 9 shows a sectional view along a line IX-IX of FIG. 7.

In FIG. 8 and in FIG. 9, hydraulic device 17 is explained in greater detail in sectional views along lines VIII-VIII and IX-IX, respectively, of FIG. 7. In particular, as shown in FIG. 9, hydraulic device 17 is implemented as particularly space-saving. Half shells 52 and 68 are made of semifinished sheet metal products and therefore have comparatively light and small constructions. Deformations 86 allow the hydraulic leak tightness required for the operation of hydraulic device 17. In addition, the leak tightness may be assisted by gluing and/or a flat sealant—for example, a film. However, this is not shown in FIGS. 8 and 9.

Figure 10:
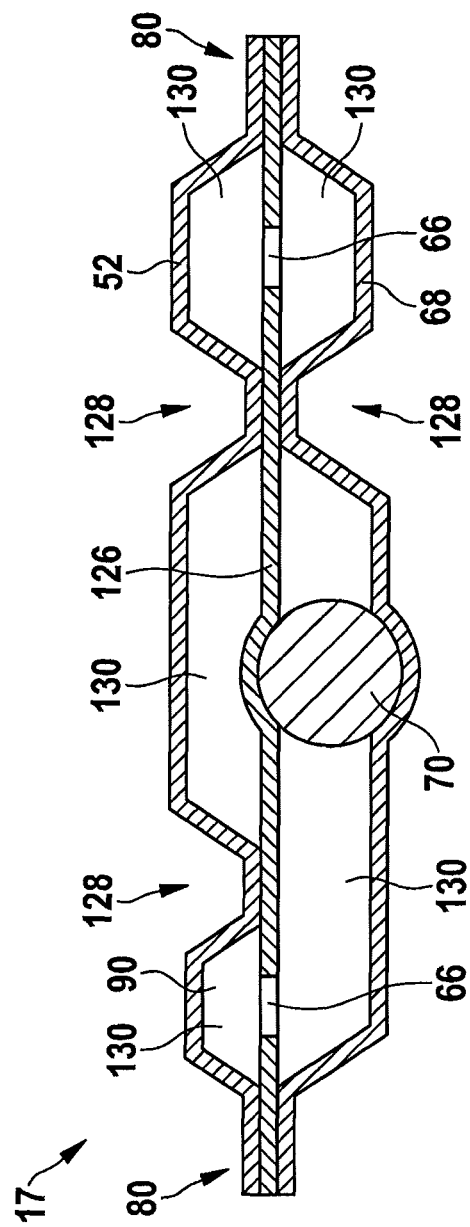
FIG. 10 shows a specific embodiment of the hydraulic device with the use of an intermediate plate.

FIG. 10 shows an embodiment of hydraulic device 17 in a sectional view, in which an intermediate plate 126 is situated between first and second half shells 52 and 68. Intermediate plate 126 has openings 66, to hydraulically connect hydraulic areas 130 to one another, which are partially designed as hydraulic channels 90. The strength of hydraulic device 17 and intermediate plate 126 is increased by supports 128.

In the present case, intermediate plate 126 is manufactured from an identical semifinished sheet metal product as half shells 52 and 68. First half shell 52, second half shell 68, and intermediate plate 126 are connected to one another permanently at sections 80 and externally hydraulically sealed with the aid of deformations 86. Deformations 86 are also used to fasten supports 128 on intermediate plate 126. Deformations 86 are not shown in FIG. 10, however.

The assembly of hydraulic device 17 according to FIG. 10 may optionally be carried out in a single step. It is also possible to first connect first half shell 52 and intermediate plate 126 to one another, and then to attach second half shell 68 in a further step.

What is claimed is:

1. A method for manufacturing a hydraulic device, in which at least one hydraulic channel and at least one connection are at least one of manufactured and hydraulically connected to one another, the hydraulic device including at least one of: a hydraulic module of a transmission, or a valve module for filling and emptying a hydraulic accumulator; the method comprising:
    forming at least two plates with the aid of a process including at least one of: cold forming, deep drawing, or punching;
    situating at least one intermediate plate between the at least two plates, wherein the at least one hydraulic channel is formed in the at least one intermediate plate to allow an exchange of fluid between cavities provided in the hydraulic device; and
    forming a plurality of deformations in the at least one intermediate plate and the at least two plates along edge sections, to permanently connect and hydraulically seal the at least two plates and the at least one intermediate plate to one another at the edge sections, using at least one of: punch riveting, or clinching;
    wherein at least punching and punch riveting processes are carried out in the same work step.

2. The method as recited in claim 1, wherein at least one of: a component and at least one hydraulic assembly, is integrated into the hydraulic device before shaping.

3. The method as recited in claim 1, wherein the at least two plates are semifinished products implemented as a coil.

4. The method as recited in claim 1, wherein the plurality of deformations are formed by passing a ram into the at least two plates.

5. The method as recited in claim 1, wherein the plurality of deformations are arranged in at least one line along at least one of the edge sections.

6. The method as recited in claim 1, wherein the plurality of deformations are arranged in a plurality of lines along a plurality of the edge sections.

7. The method as recited in claim 1, wherein the deformations are used to fasten supports on the at least one intermediate plate.

8. The method as recited in claim 1, wherein the at least two plates are connected to one another by employing the at least one intermediate plate.

9. The method as recited in claim 8, wherein the at least one intermediate plate is formed by at least one of cold forming, deep drawing, punching, punch riveting, and clinching.

10. The method as recited in claim 1, further comprising:
    shaping a first plate into a half shell;
    shaping a second plate into a half shell;
    inserting at least one of a component and at least one hydraulic assembly, into at least one of the half shells;
    inserting the at least one intermediate plate; and
    connecting the two half shells and simultaneously manufacturing at least regional hydraulic sealing sections with the air of at least one punch riveting, clinching, soldering, welding, and gluing.

11. The method as recited in claim 10, wherein the inserted at least one of the component and the hydraulic assembly has an oversize in relation to a formation of the half shells into which the component or the hydraulic assembly is inserted.

\* \* \* \* \*